United States Patent
You et al.

(10) Patent No.: US 10,978,724 B2
(45) Date of Patent: Apr. 13, 2021

(54) METHOD AND SYSTEM FOR REMOVING RESIDUAL WATER IN FUEL CELL STACK

(71) Applicants: HYUNDAI MOTOR COMPANY, Seoul (KR); KIA MOTORS CORPORATION, Seoul (KR)

(72) Inventors: Chang Seok You, Hwaseong-Si (KR); Sung Do Kim, Seoul (KR); Min Su Kang, Paju-Si (KR); Soon Woo Kwon, Yongin-Si (KR); Dong Hun Lee, Anyang-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 168 days.

(21) Appl. No.: 16/197,158

(22) Filed: Nov. 20, 2018

(65) Prior Publication Data

US 2020/0119375 A1 Apr. 16, 2020

(30) Foreign Application Priority Data

Oct. 11, 2018 (KR) .................. 10-2018-0121012

(51) Int. Cl.
| | |
|---|---|
| *H01M 8/04119* | (2016.01) |
| *H01M 8/04537* | (2016.01) |
| *H01M 8/0432* | (2016.01) |
| *H01M 8/04828* | (2016.01) |
| *H01M 8/04746* | (2016.01) |
| *H01M 8/04492* | (2016.01) |

(52) U.S. Cl.
CPC ..... *H01M 8/04156* (2013.01); *H01M 8/0432* (2013.01); *H01M 8/04492* (2013.01); *H01M 8/04559* (2013.01); *H01M 8/04776* (2013.01); *H01M 8/04828* (2013.01)

(58) Field of Classification Search
CPC ......... H01M 8/04119; H01M 8/04156; H01M 8/04537; H01M 8/04559; H01M 8/04492; H01M 8/04828; H01M 8/04746; H01M 8/04776; H01M 8/0432
See application file for complete search history.

(56) References Cited

U.S. PATENT DOCUMENTS

| | | | | |
|---|---|---|---|---|
| 2007/0026276 A1* | 2/2007 | Ogawa | ............. | H01M 8/04492 429/414 |
| 2013/0052545 A1* | 2/2013 | Okuyoshi | ......... | H01M 8/04492 429/400 |

FOREIGN PATENT DOCUMENTS

KR 10-2008-0048215 A 6/2008

* cited by examiner

*Primary Examiner* — Karie O'Neill Apicella
(74) *Attorney, Agent, or Firm* — Morgan, Lewis & Bockius LLP

(57) ABSTRACT

A method for removing residual water in a fuel cell stack includes: blocking, by an air compressor, air supply to a fuel cell stack upon shutting down of fuel cell; measuring a cell voltage of the fuel cell stack while the air supply is blocked; estimating an amount of residual water in the fuel cell stack based on the measured cell voltage of the fuel cell stack; and removing, by a driving controller, the residual water in the fuel cell stack by driving the air compressor based on the estimated amount of water.

14 Claims, 4 Drawing Sheets

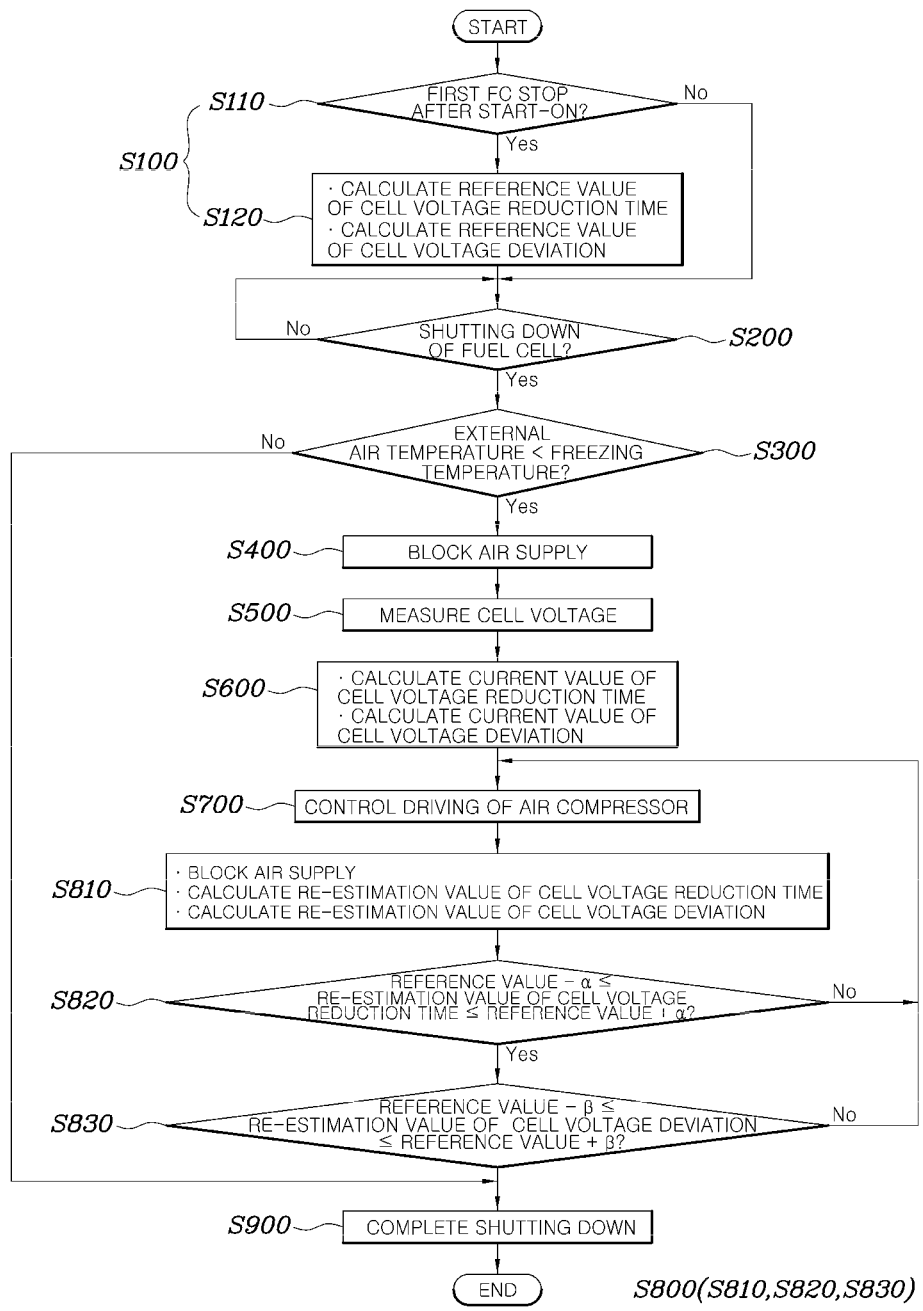

[FIG. 2]
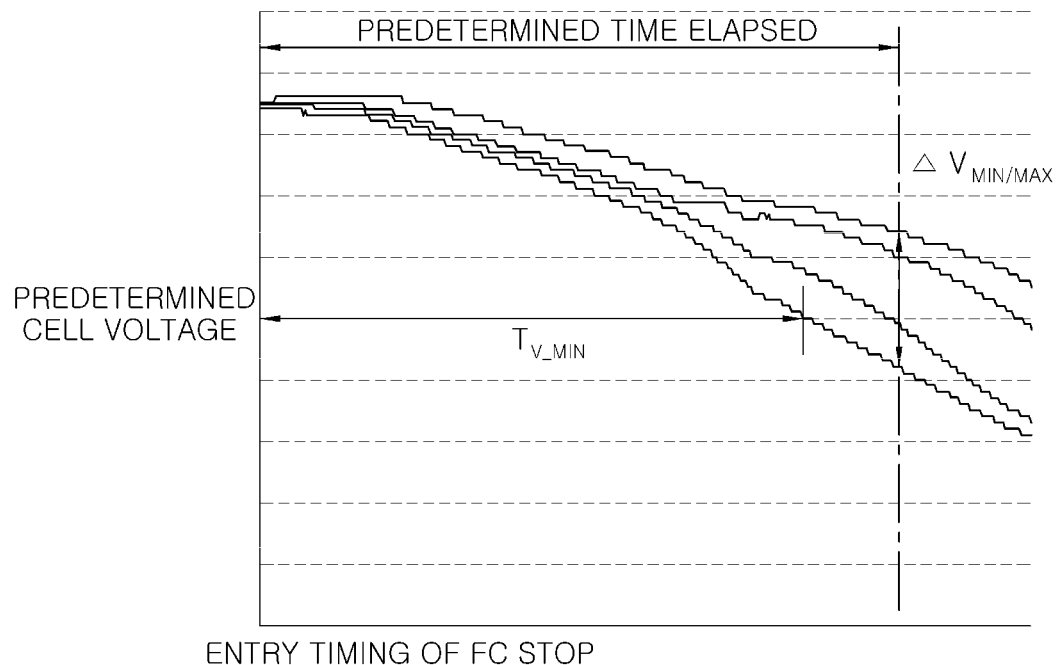

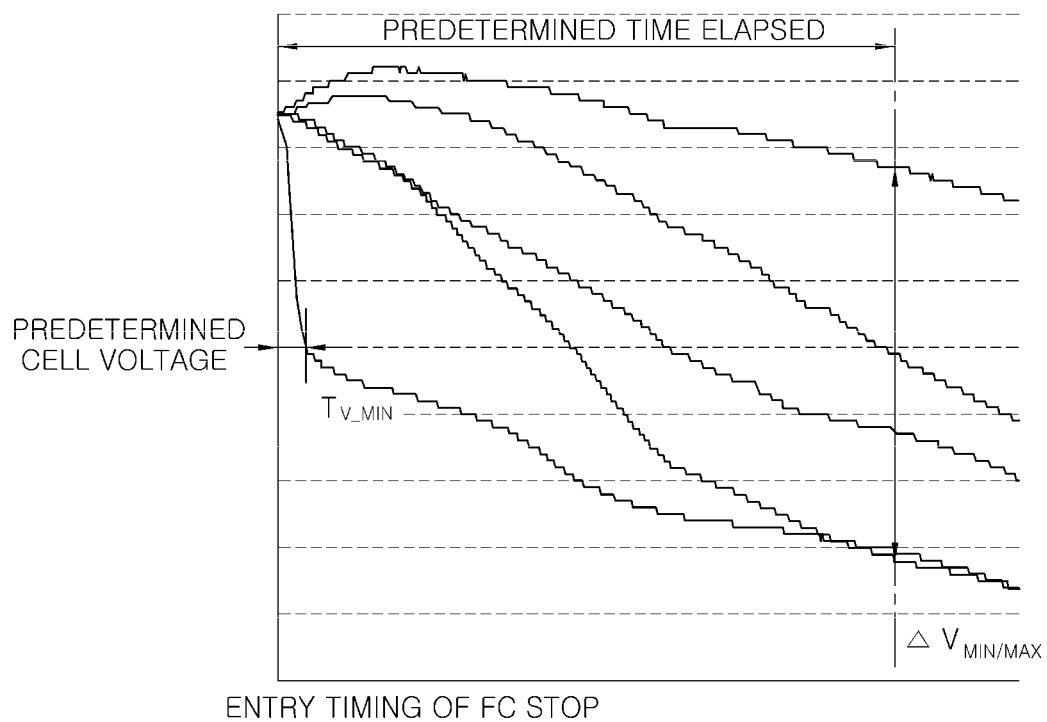
[FIG. 3]

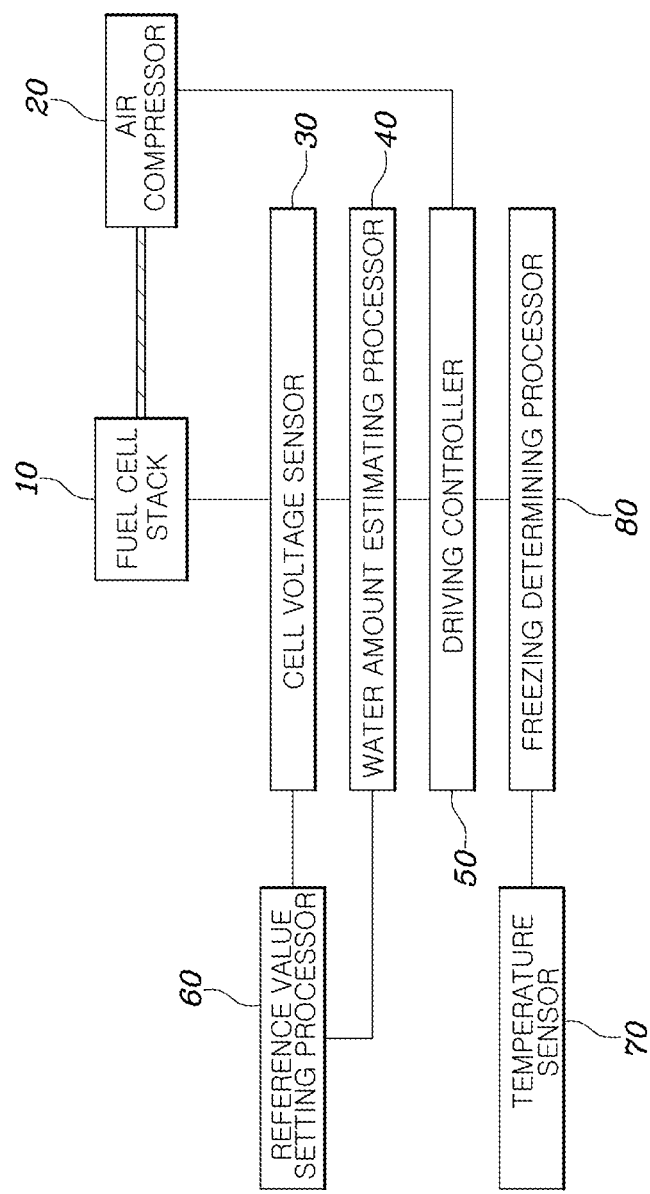
[FIG. 4]

METHOD AND SYSTEM FOR REMOVING RESIDUAL WATER IN FUEL CELL STACK

CROSS REFERENCE TO RELATED APPLICATION

The present application claims priority of Korean Patent Application No. 10-2018-0121012 filed On Oct. 11, 2018, the entire contents of which is incorporated herein for all purposes by this reference.

TECHNICAL FIELD

The present disclosure relates to a method and a system for removing residual water in a fuel cell stack, and more particularly, to a technique for removing to prevent residual water in a fuel cell stack from being frozen when shutting down of a fuel cell.

BACKGROUND

A fuel cell is a power generation device as a cell for converting chemical energy generated by oxidation of fuel directly into electrical energy. The fuel cell is basically the same as a chemical cell in that it uses oxidation and reduction reactions, but unlike the chemical cell that performs a cell reaction in a closed system, it is different in that reactants are continuously supplied from the outside and accordingly, reaction products are continuously removed to the outside of the system.

In recent years, a fuel cell power generation system is commercialized, and the reaction products of the fuel cell are pure water, such that the development for using it as an energy source for an eco-friendly vehicle has been actively performed.

However, when the fuel cell is kept in the shutting down in the state that external temperature is extremely low, there has been a problem in that a Gas Diffusion Layer (GDL) was broken by the volume expansion due to freezing of residual generated water in a fuel cell stack.

In order to prevent such a problem, conventionally, a Cold Shut Down (CSD) control for removing the residual water of the fuel cell stack upon the shutting down of the fuel cell has been applied, but without measuring the amount of residual water in the fuel cell stack, it has been controlled to discharge the residual water simply for a predetermined time.

According to such a control, the residual water in the fuel cell stack was not sufficiently discharged, or when excessively supplying air, the amount of oxygen crossed over to a hydrogen electrode of the fuel cell stack increased or an air compressor was excessively driven, thus reducing fuel efficiency of the fuel cell, etc.

The foregoing is intended merely to aid in the understanding of the background of the present disclosure, and is not intended to mean that the present disclosure falls within the purview of the related art that is already known to those skilled in the art.

SUMMARY OF THE DISCLOSURE

The present disclosure is intended to solve the above problems, and an object of the present disclosure is to provide a method and a system for removing residual water in a fuel cell stack by estimating the amount of residual water in the fuel cell stack based on a cell voltage of the fuel cell stack to drive an air compressor.

A method for removing residual water in a fuel cell stack in accordance with the present disclosure for achieving the object includes: blocking, by an air compressor, air supply to a fuel cell stack upon shutting down of a fuel cell; measuring, by a cell voltage sensor, a cell voltage of the fuel cell stack while the air supply is blocked; estimating, by a water amount estimating processor, an amount of residual water in the fuel cell stack based on the measured cell voltage of the fuel cell stack; and removing, by a driving controller, the residual water in the fuel cell stack by driving the air compressor based on the estimated amount of water.

The measuring the cell voltage of the fuel cell stack can measure voltages of some or all of a plurality of cells included in the fuel cell stack from when the air supply is blocked.

The estimating the amount of residual water in the fuel cell stack can estimate the amount of residual water in the fuel cell stack based on a current value of a cell voltage reduction time that is the time from when the air supply is blocked to when a minimum value of the measured cell voltages of the fuel cell stack becomes equal to or smaller than a predetermined cell voltage or a current value of a cell voltage deviation that is a difference between a maximum value and a minimum value of the measured cell voltages of the fuel cell stack when elapsing a predetermined time from when the air supply is blocked.

The estimating the amount of residual water in the fuel cell stack can estimate that the amount of residual water in the fuel cell stack is large as the current value of the cell voltage reduction time reduces.

The estimating the amount of residual water in the fuel cell stack can estimate that the amount of residual water in the fuel cell stack is large as the current value of the cell voltage deviation increases.

The removing the residual water in the fuel cell stack can control an air compressor to be driven according to a predetermined RPM command during a predetermined duration based on the estimated amount of water.

The method for removing the residual water in the fuel cell stack can further include, before the blocking the air supply, measuring the external air temperature of the fuel cell stack, and determining the possibility of freezing of the residual water in the fuel cell stack based on the measured external air temperature.

The method for removing the residual water in the fuel cell stack can further include, before the blocking the air supply, calculating a reference value of the cell voltage reduction time and a reference value of the cell voltage deviation, respectively, in a FC STOP mode of a fuel cell, and the estimating the amount of residual water in the fuel cell stack can estimate the amount of residual water in the fuel cell stack using the current value of the cell voltage reduction time and the current value of the cell voltage deviation, respectively, based on the calculated reference value of the cell voltage reduction time and the calculated reference value of the cell voltage deviation.

The calculating the reference value of the cell voltage reduction time and the reference value of the cell voltage deviation, respectively, can calculate the reference value of the cell voltage reduction time and the reference value of the cell voltage deviation in a first FC STOP mode of the fuel cell after the start-on, respectively.

The method for removing the residual water in the fuel cell stack can further include, after the removing the residual water in the fuel cell stack, re-estimating the amount of residual water in the fuel cell stack while the air supply to the fuel cell stack is blocked; and removing the residual water in the fuel cell stack based on the re-estimated amount of residual water in the fuel cell stack or completing the shutting down.

The method for removing the residual water in the fuel cell stack can further include, after the removing the residual water in the fuel cell stack, calculating a re-estimation value of the cell voltage reduction time and a re-estimation value of the cell voltage deviation, respectively, while the air supply to the fuel cell stack is blocked; and removing the residual water in the fuel cell stack according to whether or not the re-estimation value of the cell voltage reduction time and the re-estimation value of the cell voltage deviation are included in a normal range of the cell voltage reduction time having the reference value of the cell voltage reduction time and a normal range of the cell voltage deviation having the reference value of the cell voltage deviation, respectively, or completing the shutting down.

The removing the residual water in the fuel cell stack or completing the shutting down can remove the residual water in the fuel cell stack by driving the air compressor based on the re-estimation value of the cell voltage reduction time and the re-estimation value of the cell voltage deviation when the re-estimation value of the cell voltage reduction time is not included in the normal range of the cell voltage reduction time or the re-estimation value of the cell voltage deviation is not included in the normal range of the cell voltage deviation.

A system for removing residual water in a fuel cell stack in accordance with the present disclosure for achieving the object includes: a fuel cell stack; an air compressor for supplying air to the fuel cell stack; a cell voltage sensor for measuring a plurality of cell voltages included in the fuel cell stack; a water amount estimating processor for estimating an amount of residual water in the fuel cell stack based on the cell voltages measured by the cell voltage sensor upon shutting down of a fuel cell; and a driving controller for removing the residual water in the fuel cell stack by driving the air compressor based on the amount of water estimated by the water amount estimating processor.

The system for removing the residual water in the fuel cell stack can further include a freezing determining processor for determining the possibility of freezing of the residual water in the fuel cell stack based on the external air temperature of the fuel cell stack measured by using a temperature sensor.

The water amount estimating processor can estimate the amount of residual water in the fuel cell stack based on a current value of a cell voltage reduction time that is the time from when the air supply is blocked to when a minimum value of the measured cell voltages of the fuel cell stack becomes equal to or smaller than a predetermined cell voltage or a current value of a cell voltage deviation that is a difference between a maximum value and a minimum value of the measured cell voltages of the fuel cell stack when elapsing a predetermined time from when the air supply is blocked.

The system for removing the residual water in the fuel cell stack can further include a reference value setting processor for setting a reference value of the cell voltage reduction time or a reference value of the cell voltage deviation based on the cell voltage of the fuel cell stack measured by the cell voltage sensor in a FC STOP mode of a fuel cell.

According to the method and system for removing the residual water in the fuel cell stack of the present disclosure, it is possible to remove the residual water in the fuel cell stack when the external air temperature is extremely low, thus preventing freezing thereof.

In addition, it is possible to measure and remove the amount of residual water in the fuel cell stack, thus preventing excessive air supply to the air compressor.

In addition, it is possible to reduce the amount of oxygen crossed over to the hydrogen electrode of the fuel cell stack, thus enhancing durability of the fuel cell stack.

In addition, it is possible to prevent unnecessary power generation of the fuel cell stack and to reduce power unnecessarily consumed in the air compressor, thus enhancing fuel efficiency of the fuel cell.

BRIEF DESCRIPTION OF THE DRAWINGS

The above and other objects, features and other advantages of the present disclosure will be more clearly understood from the following detailed description when taken in conjunction with the accompanying drawings, in which:

FIG. 1 is a flowchart of a method for removing residual water in a fuel cell stack in accordance with an embodiment of the present disclosure.

FIGS. 2 and 3 are graphs illustrating a change in a cell voltage of the fuel cell stack according to the amount of residual water in the fuel cell stack.

FIG. 4 is a block diagram of a system for removing the residual water in the fuel cell stack in accordance with an embodiment of the present disclosure.

DETAILED DESCRIPTION OF THE DISCLOSURE

Specific structural and functional descriptions of the embodiments of the present disclosure disclosed in the specification or application are only for the purpose of illustrating the embodiments of the present disclosure, and the embodiments in accordance with the present disclosure can be embodied in various forms and should not be construed as limited to the embodiments set forth in the specification or application.

Various modifications and various forms can be made in the embodiments in accordance with the present disclosure, so that specific embodiments are illustrated in the drawings and described in detail in the specification or application. It should be understood, however, that it is not intended to limit the embodiments in accordance with the concepts of the present disclosure to the particular disclosed forms, but includes all modifications, equivalents, and alternatives falling within the spirit and technical scope of the present disclosure.

The terms "first" and/or "second," and the like are used to illustrate various components, but the components should not be limited by the terms. The terms are used to differentiate one element from another, for example, a first component can be referred to as a second component, and similarly, the second component can be also referred to as the first component without departing from claims in accordance with the concepts of the present disclosure.

It will be understood that when an element is referred to as being "connected" or "coupled" to another element, it can be "directly connected" or "coupled" to the other element, but also to the other element with other elements interposed therebetween. On the other hand, it should be understood that any configuration element has no other element in between the time stated that "directly connected" or "directly coupled" to another element. Other expressions that describe the relationship between elements, such as "between" and "directly between" or "adjacent to" and "directly adjacent to" should be interpreted as well.

The terminology used the specification is for the purpose of describing particular embodiments only and is not intended to limit the present disclosure. The singular forms are intended to include the plural forms as well, unless the context clearly indicates otherwise. In the specification, It will be further understood that the terms "comprises" or "includes," and the like specify the presence of stated features, integers, steps, operations, elements, components or combination thereof, but do not preclude the presence or addition of one or more other features, integers, steps, operations, elements, components, or combination thereof.

Unless otherwise defined, all terms including technical and scientific terms used herein have the same meaning as commonly understood by one of ordinary skill in the art to which the present disclosure belongs. It will be further understood that terms, such as those defined in commonly used dictionaries, should be additionally interpreted as having a meaning that is consistent with their meaning in the context of the relevant art, and will not be interpreted in an idealized or overly formal sense unless expressly so defined in the specification.

Hereinafter, preferred embodiments of the present disclosure will be described in detail with reference to the accompanying drawings. The same reference numerals in each drawing denote the same members.

FIG. 1 is a flowchart of a method for removing residual water in a fuel cell stack in accordance with an embodiment of the present disclosure.

Referring to FIG. 1, a method for removing residual water in a fuel cell stack in accordance with an embodiment of the present disclosure includes: upon the shutting down S200, blocking the air supply to a fuel cell stack S400; measuring a cell voltage of the fuel cell stack while the air supply is blocked S500; estimating the amount of residual water in the fuel cell stack based on the measured cell voltage of the fuel cell stack S600; and removing the residual water in the fuel cell stack by driving an air compressor based on the estimated amount of water S700.

The shutting down of a fuel cell system can all include the case that terminates the start according to an ignition off signal of the user or transmits a shutting down command from a controller according to a specific condition S200.

When the shutting down of the fuel cell system is requested S200, the air supplied to the fuel cell stack can be first blocked S400. It can be controlled so that the air compressor included in an air supply system for supplying air to the fuel cell stack becomes Off, and can be controlled so that an air supply valve interposed between the air compressor and the cathode of the fuel cell stack is blocked.

The measuring the cell voltage of the fuel cell stack S500 can measure the cell voltage of the fuel cell stack while the air supply to the fuel cell stack is blocked. Particularly, when the air supply is blocked, the cell voltage of the fuel cell stack will gradually reduce, such that the cell voltage can be periodically measured to measure a change in the cell voltage.

The estimating the amount of residual water in the fuel cell stack S600 can measure the amount of residual water in the fuel cell stack using the measured cell voltage of the fuel cell stack.

The removing the residual water in the fuel cell stack S700 drives the air compressor based on the estimated amount of water and can control the air compressor according to the estimated amount of residual water, thus removing the residual water in the fuel cell stack.

Accordingly, it is possible to prevent unnecessary driving of the air compressor and remove the residual water in the fuel cell stack by estimating the amount of residual water in the fuel cell stack to control the air compressor, thus efficiently driving the air compressor.

The measuring the cell voltage of the fuel cell stack S500 can measure the voltages of some or all of a plurality of cells included in the fuel cell stack from when the air supply is blocked.

Tens to hundreds of cells can be included in the fuel cell stack. The cell voltage of the fuel cell stack can measure the voltages of all the cells included in the fuel cell stack or measure the voltages of some of the cells therein.

FIGS. 2 and 3 are graphs illustrating a change in the cell voltage of the fuel cell stack according to the amount of residual water in the fuel cell stack. Particularly, FIG. 2 illustrates the change in the cell voltage of the fuel cell stack when there is no residual water in the fuel cell stack, and FIG. 3 illustrates the change in the cell voltage of the fuel cell stack when the amount of residual water in the fuel cell stack is large.

Referring to FIGS. 2 and 3, the estimating the amount of residual water in the fuel cell stack S600 can measure the amount of residual water in the fuel cell stack based on a current value of a cell voltage reduction time ($T_{V\_MIN}$) that is the time from when the air supply is blocked to when a minimum value of the measured cell voltages of the fuel cell stack becomes equal to or smaller than a predetermined cell voltage or a current value of a cell voltage deviation ($\Delta V_{MIN/MAX}$) that is a difference between a maximum value and a minimum value of the measured cell voltages of the fuel cell stack when elapsing a predetermined time from when the air supply is blocked. When entering a FC Stop mode, the air supply is blocked, such that the entry timing of the FC Stop mode can be regarded as when the air supply is blocked.

Particularly, as illustrated in FIGS. 2 and 3, when the amount of residual water in the fuel cell stack is large, water is unevenly distributed between the cells of the fuel cell stack. Particularly, in the region where there is residual water in the cell, hydrogen and oxygen are difficult to react with each other, such that the reaction area of the cell is reduced to rapidly reduce the cell voltage. On the contrary, the cell containing less water has a relatively large reaction area, such that the cell voltage reduces relatively and smoothly.

Accordingly, a difference in reactivity occurs between a plurality of cells, and accordingly, a change in the cell voltage is differentiated. The present disclosure estimates the amount of residual water in the fuel cell stack through the change of the cell voltage after blocking the air supply. Particularly, the cell voltage reduction time ($T_{V\_MIN}$) and the cell voltage deviation ($\Delta V_{MIN/MAX}$) can be used as a factor for estimating the amount of residual water in the fuel cell stack.

The cell voltage reduction time ($T_{V\_MIN}$) is the time from when the air supply is blocked to when the minimum value of the measured cell voltages of the fuel cell stack becomes equal to or smaller than a predetermined cell voltage. When the air supply to the fuel cell stack is blocked, the cell voltage gradually reduces. The time taken from when the air supply is blocked to when the minimum value of the measured cell voltages in the plurality of cells becomes equal to or smaller than the predetermined cell voltage can be measured. The predetermined cell voltage can be appropriately preset considering the cell voltage and cell voltage falling rate during the operation of the fuel cell.

In addition, the cell voltage deviation ($\Delta V_{MIN/MAX}$) is a difference between the maximum value and minimum value of the measured cell voltages of the fuel cell stack when elapsing a predetermined time from when the air supply is blocked. A deviation occurs between the cell voltages included in the fuel cell stack, and a maximum deviation, which is a difference between the maximum value and minimum value of the cell voltage, can be calculated as the cell voltage deviation) ($\Delta V_{MIN/MAX}$).

In another embodiment, the cell voltage deviation ($\Delta V_{MIN/MAX}$) can be also calculated by a ratio between the maximum value of the cell voltage and the minimum value of the cell voltage.

The estimating the amount of residual water in the fuel cell stack S600 can calculate a current value of the cell voltage reduction time ($T_{V\_MIN}$) and a current value of the cell voltage deviation ($\Delta V_{MIN/MAX}$), respectively, and can estimate the amount of residual water in the fuel cell stack using the calculated current value of the voltage reduction time ($T_{V\_MIN}$) and the calculated current value of the cell voltage deviation ($\Delta V_{MIN/MAX}$).

The estimating the amount of residual water in the fuel cell stack S600 can estimate that the amount of residual water in the fuel cell stack is large as the current value of the cell voltage reduction time ($T_{V\_MIN}$) reduces.

In addition, the estimating the amount of residual water in the fuel cell stack can estimate that the amount of residual water in the fuel cell stack is large as the current value of the cell voltage deviation ($\Delta V_{MIN/MAX}$) increases.

In addition, a method for estimating the amount of residual water in the fuel cell stack using both the cell voltage reduction time ($T_{V\_MIN}$) and the cell voltage deviation ($\Delta V_{MIN/MAX}$) can estimate it by the function that the residual water increases as the cell voltage reduction time ($T_{V\_MIN}$) is small and the cell voltage deviation ($\Delta V_{MIN/MAX}$) is large or by a pre-mapped map.

The removing the residual water in the fuel cell stack S700 can control so that the air compressor is driven according to a predetermined RPM command during a predetermined duration based on the estimated amount of water.

That is, the RPM command ($\omega_{cmd}$) of the air compressor can be constantly preset, and the duration can be set according to the estimated amount of water. The duration can be set to increase together as the estimated amount of water increases. The RPM command ($\omega_{cmd}$) of the air compressor can be preset as a maximum RPM, for example.

Accordingly, it is possible to quickly remove the residual water in the fuel cell stack by the air compressor.

Before the blocking the air supply S400, the present disclosure can further include measuring the external air temperature of the fuel cell stack, and determining the possibility of freezing of the residual water in the fuel cell stack based on the measured external air temperature S300.

That is, it can determine that it is extremely low temperature that water can be frozen while the shutting down of the fuel cell is kept by measuring the external air temperature of the fuel cell stack using a temperature sensor. When the external air temperature is lower than a predetermined freezing temperature by comparing it with the predetermined freezing temperature, it can be determined that water can be frozen.

The predetermined freezing temperature can be preset as 0° C., for example.

When the external air temperature is lower than the predetermined freezing temperature, the air supply can be blocked and the cell voltage can be measured. When the external air temperature is equal to or greater than the predetermined freezing temperature, a Cold Shut Down (CSD) control can be terminated by determining that there is no possibility of freezing of water.

Accordingly, it is possible to determine the external air temperature in advance to determine whether or not to perform the Cold Shut Down (CSD) control and to drive the air compressor only in a necessary situation, thus enhancing fuel efficiency and durability thereof.

Before the blocking the air supply S400, the present disclosure can further include calculating a reference value of the cell voltage reduction time ($T_{V\_MIN}$) and a reference value of the cell voltage deviation ($\Delta V_{MIN/MAX}$) in the FC STOP mode of the fuel cell, respectively, and the estimating the amount of residual water in the fuel cell stack S600 can estimate the amount of residual water in the fuel cell stack using the current value of the cell voltage reduction time ($T_{V\_MIN}$) and the current value of the cell voltage deviation ($\Delta V_{MIN/MAX}$), respectively, based on the calculated reference value of the cell voltage reduction time ($T_{V\_MIN}$) and the calculated reference value of the cell voltage deviation ($\Delta V_{MIN/MAX}$).

The FC STOP mode of the fuel cell is a mode in which the power generation of the fuel cell stack is stopped upon the start-on of the fuel cell, and a fuel cell vehicle having a large fluctuation of load frequently enters. In the FC STOP mode of the fuel cell, the air supply to the fuel cell stack is blocked.

That is, the reference value of the cell voltage reduction time ($T_{V\_MIN}$) and the reference value of the cell voltage deviation ($\Delta V_{MIN/MAX}$) can be calculated while the air supply is blocked in the FC STOP mode. In addition, the amount of residual water in the fuel cell stack can be estimated by using the calculated current value of the cell voltage reduction time ($T_{V\_MIN}$) and the calculated current value of the cell voltage deviation ($\Delta V_{MIN/MAX}$), respectively, based on the reference value of the cell voltage reduction time ($T_{V\_MIN}$) and the reference value of the cell voltage deviation ($\Delta V_{MIN/MAX}$).

Specifically, the amount of residual water in the fuel cell stack can be estimated by using a ratio or a difference between the reference value of the cell voltage reduction time ($T_{V\_MIN}$) and the current value of the cell voltage reduction time ($T_{V\_MIN}$), or a ratio or a difference between the reference value of the cell voltage deviation ($\Delta V_{MIN/MAX}$) and the current value of the cell voltage deviation ($\Delta V_{MIN/MAX}$). Herein, the amount of water can be also estimated by the pre-mapped map or by applying the ratio or the difference to the predetermined function.

The cell voltage reduction time ($T_{V\_MIN}$) and cell voltage deviation ($\Delta V_{MIN/MAX}$) of the fuel cell stack can be changed not only by the amount of residual water in the fuel cell stack, but also by irreversible deterioration. That is, as the fuel cell stack is irreversibly deteriorated by continuous power generation, the cell voltage reduction time ($T_{V\_MIN}$) can be reduced, and the cell voltage deviation ($\Delta V_{MIN/MAX}$) can be increased.

Accordingly, it is possible to newly measure the cell voltage reduction time ($T_{V\_MIN}$) and the cell voltage deviation ($\Delta V_{MIN/MAX}$) to set each of the reference values, and to compare it with the each of the current values when shutting down, thus estimating the amount of residual water in the fuel cell stack more accurately.

Particularly, the calculating the reference value of the cell voltage reduction time ($T_{V\_MIN}$) and the reference value of the cell voltage deviation ($\Delta V_{MIN/MAX}$) can calculate the reference value of the cell voltage reduction time ($T_{V\_MIN}$) and the reference value of the cell voltage deviation ($\Delta V_{MIN/MAX}$), respectively, in a first FC STOP mode of the fuel cell after the start-on S110, S120.

In the first FC STOP mode after the start-on of the fuel cell, the residual water in the fuel cell stack is the least, such that it is most suitable for setting the reference value of the cell voltage reduction time ($T_{V\_MIN}$) and the reference value of the cell voltage deviation ($\Delta V_{MIN/MAX}$) due to the irreversible deterioration of the fuel cell stack in the absence of water. Accordingly, it is possible to accurately estimate the amount of residual water in the fuel cell stack.

After the removing the residual water in the fuel cell stack S700, the present disclosure can include re-estimating the amount of residual water in the fuel cell stack while the air supply to the fuel cell stack is blocked; and removing the residual water in the fuel cell stack based on the re-estimated amount of residual water in the fuel cell stack or completing the shutting down S900.

After the residual water in the fuel cell stack is removed by driving the air compressor, the amount of residual water in the fuel cell stack is re-estimated again, and when the amount of residual water in the re-estimated amount of residual water in the fuel cell stack is equal to or less than a certain level, the shutting down can be completed as it is. When the re-estimated amount of residual water in the fuel cell stack exceeds a certain level, it is determined that the residual water in the fuel cell stack has not been sufficiently removed, such that the residual water in the fuel cell stack can be removed by driving the air compressor again.

That is, after removing residual water in the fuel cell stack by driving the air compressor, it is possible to reliably remove the residual water in the fuel cell stack by additionally estimating and removing the amount of water.

After the removing the residual water in the fuel cell stack S700, the present disclosure can include calculating a re-estimation value of the cell voltage reduction time ($T_{V\_MIN}$) and a re-estimation value of the cell voltage deviation ($\Delta V_{MIN/MAX}$), respectively, while the air supply to the fuel cell stack is blocked S810; and removing the residual water in the fuel cell stack according to whether or not the re-estimation value of the cell voltage reduction time ($T_{V\_MIN}$) and the re-estimation value of the cell voltage deviation ($\Delta V_{MIN/MAX}$) are included in a normal range of the cell voltage reduction time ($T_{V\_MIN}$) having the reference value of the cell voltage reduction time ($T_{V\_MIN}$) and a normal range of the cell voltage deviation ($\Delta V_{MIN/MAX}$) having the reference value of the cell voltage deviation ($\Delta V_{MIN/MAX}$), respectively S820, S830 or completing the shutting down S900.

That is, like estimating the residual water in advance, the re-estimating the amount of residual water in the fuel cell stack S810 can calculate the re-estimation value of the cell voltage reduction time ($T_{V\_MIN}$) and the re-estimation value of the cell voltage deviation ($\Delta V_{MIN/MAX}$), respectively, while the air supply to the fuel cell stack is blocked, and can re-estimate the amount of residual water in the fuel cell stack using the calculated re-estimation value of the cell voltage reduction time ($T_{V\_MIN}$) and the calculated re-estimation value of the cell voltage deviation ($\Delta V_{MIN/MAX}$).

Particularly, the removing the residual water in the fuel cell stack or completing the shutting down S900 can determine whether or not to remove the residual water in the fuel cell stack again according to whether or not the re-estimation value of the cell voltage reduction time ($T_{V\_MIN}$) and the re-estimation value of the cell voltage deviation ($\Delta V_{MIN/MAX}$) are included in the normal range of the cell voltage reduction time ($T_{V\_MIN}$) having the reference value of the cell voltage reduction time ($T_{V\_MIN}$) and the normal range of the cell voltage deviation ($\Delta V_{MIN/MAX}$) having the reference value of the cell voltage deviation ($\Delta V_{MIN/MAX}$), respectively S820, S830.

The normal range of the cell voltage reduction time ($T_{V\_MIN}$) can be set to have a certain range before and after the calculated reference value of the cell voltage reduction time ($T_{V\_MIN}$) S820, and the normal range of the cell voltage deviation ($\Delta V_{MIN/MAX}$) can be set to have a certain range before and after the reference value of the calculated reference value of the cell voltage deviation ($\Delta V_{MIN/MAX}$) S830.

The removing the residual water in the fuel cell stack or completing the shutting down S900 can remove the residual water in the fuel cell stack by driving the air compressor based on the re-estimation value of the cell voltage reduction time ($T_{V\_MIN}$) and the re-estimation value of the cell voltage deviation ($\Delta V_{MIN/MAX}$) S700 when the re-estimation value of the cell voltage reduction time ($T_{V\_MIN}$) is not included in the normal range of the cell voltage reduction time ($T_{V\_MIN}$) or the re-estimation value of the cell voltage deviation ($\Delta V_{MIN/MAX}$) is not included in the normal range of the cell voltage deviation ($\Delta V_{MIN/MAX}$).

That is, when any one of the re-estimation value of the cell voltage reduction time ($T_{V\_MIN}$) or the re-estimation value of the cell voltage deviation ($\Delta V_{MIN/MAX}$) is out of the normal range thereof, it can be determined that the residual water in the fuel cell stack has not been sufficiently removed. Accordingly, the residual water in the fuel cell stack can be removed by driving the air compressor again using the re-estimation value of the cell voltage reduction time ($T_{V\_MIN}$) and the re-estimation value of the cell voltage deviation ($\Delta V_{MIN/MAX}$).

On the contrary, when the re-estimation value of the cell voltage reduction time ($T_{V\_MIN}$) is included in the normal range of the cell voltage reduction time ($T_{V\_MIN}$), and the re-estimation value of the cell voltage deviation ($\Delta V_{MIN/MAX}$) is included in the normal range of the cell voltage deviation) ($\Delta V_{MIN/MAX}$), it can be determined that the re-estimated amount of residual water in the fuel cell stack is equal to or smaller than a certain level, thus completing the shutting down.

Accordingly, it is possible to reliably remove the residual water in the fuel cell stack, and to remove water again based on the re-estimated amount of water when it has not been sufficiently removed, thus blocking the possibility of freezing of water in advance.

FIG. 4 is a block diagram of a system for removing residual water in a fuel cell stack in accordance with an embodiment of the present disclosure.

Referring to FIG. 4, a system for removing residual water in a fuel cell stack 10 in accordance with an embodiment of the present disclosure includes: the fuel cell stack 10; an air compressor 20 for supplying air to the fuel cell stack 10; a cell voltage sensor 30 for measuring a plurality of cell voltages included in the fuel cell stack 10; a water amount estimating processor 40 for estimating the amount of residual water in the fuel cell stack 10 based on the cell voltage measured by the cell voltage sensor 30 when shutting down; and a driving controller 50 for removing the residual water in the fuel cell stack 10 by driving the air compressor 20 based on the amount of water estimated by the water amount estimating processor 40.

The fuel cell stack 10 receives hydrogen and oxygen, respectively, and induces a chemical reaction therein to generate power. In this process, water is generated, and the generated water can be controlled to be discharged to the outside during the operation of a fuel cell.

However, when the shutting down of the fuel cell is kept, there is the possibility of freezing when the external air temperature is extremely low.

The air compressor 20 is a device for supplying air to the cathode of the fuel cell stack 10. All devices for supplying air such as an air blower can be included therein.

The cell voltage sensor 30 measures the voltages of all or some of the plurality of cells included in the fuel cell stack 10. The cell voltage sensor 30 may include a voltage sensor in each of the plurality of cells.

The water amount estimating processor 40 can estimate the amount of residual water in the fuel cell stack 10 based on the cell voltage measured by the cell voltage sensor 30 upon the shutting down. Particularly, the water amount estimating processor 40 can estimate the amount of residual water in the fuel cell stack 10 through a change in the cell voltage measured by the cell voltage sensor 30 while the air supply to the fuel cell stack 10 is blocked when shutting down.

The driving controller 50 is a controller for controlling the air compressor 20, and can remove the residual water in the fuel cell stack 10 by driving the air compressor 20 based on the amount of water estimated by the water amount estimating processor 40. Specifically, the driving controller 50 can control so that the air compressor 20 is driven according to a predetermined RPM command during a predetermined duration based on a predetermined-estimated amount of water.

In addition, the present disclosure can further include a freezing determining processor 80 for determining freezing of residual water in the fuel cell stack 10 based on the measured external air temperature of the fuel cell stack 10 using a temperature sensor 70. The temperature sensor 70 can be installed outside the fuel cell stack 10 to measure the external air temperature, and the freezing determining processor 80 can determine the possibility of freezing by comparing the external air temperature with a predetermined freezing temperature.

The water amount estimating processor 40 can estimate the amount of residual water in the fuel cell stack 10 based on a current value of a cell voltage reduction time that is the time from when the air supply is blocked to when a minimum value of the measured cell voltages of the fuel cell stack 10 becomes equal to or smaller than a predetermined cell voltage or a current value of a cell voltage deviation that is a difference between a maximum value and a minimum value of the measured cell voltages of the fuel cell stack 10 when elapsing a predetermined time from when the air supply is blocked.

In addition, the present disclosure can further include a reference value setting processor 60 for setting a reference value of the cell voltage reduction time or a reference value of the cell voltage deviation based on the cell voltage of the fuel cell stack 10 measured by the cell voltage sensor 30 in a FC STOP mode of the fuel cell.

The description of the system for removing the residual water in the fuel cell stack 10 is redundant with the description of the method for removing the residual water in the fuel cell stack 10, such that detailed description thereof will be omitted.

In the various embodiments of the present disclosure, each of the water amount estimating processor 40, the driving controller 50, the reference value setting processor 60, and the freezing determining processor 80 may be a central processing unit (CPU) as an electronic circuitry within a computer that carries out instructions of a program by performing the basic arithmetic, logic, controlling, and input/output (I/O) operations specified by the instructions. These elements may be separate processors or embedded in one processor, or in an electronic control unit (ECU) which controls the water amount estimating processor 40, the driving controller 50, the reference value setting processor 60, and the freezing determining processor 80 to perform respective functions.

Although the present disclosure has been illustrated and described in connection with the specific embodiments, those skilled in the art will appreciate that the present disclosure can be variously modified and changed without departing from the technical spirit of the present disclosure as disclosed in the accompanying claims.

What is claimed is:

1. A method for removing residual water in a fuel cell stack, the method comprising steps of:
   calculating, by a reference value setting processor, a reference value of a cell voltage reduction time and a reference value of a cell voltage deviation, respectively, in a fuel cell (FC) stop mode of fuel cell;
   blocking, by an air compressor, air supply to the fuel cell stack upon shutting down of fuel cell;
   measuring, by a cell voltage sensor, a cell voltage of the fuel cell stack while the air supply is blocked;
   estimating, by a water amount estimating processor, an amount of residual water in the fuel cell stack based on the measured cell voltage of the fuel cell stack; and
   removing, by a driving controller, the residual water in the fuel cell stack by driving the air compressor based on the estimated amount of water,
   wherein the cell voltage reduction time is a period of time from when the air supply is blocked to when a minimum value of the measured cell voltages of the fuel cell stack becomes equal to or smaller than a predetermined cell voltage,
   wherein the cell voltage deviation is a difference between a maximum value and the minimum value of the measured cell voltages of the fuel cell stack when a predetermined period of time during which the air supply is blocked elapses,
   wherein the step of estimating estimates the amount of residual water in the fuel cell stack based on a current time value of the cell voltage reduction time or a current deviation value of a cell voltage deviation, and
   wherein the step of estimating estimates the amount of residual water in the fuel cell stack using the current time value and the current deviation value based on the calculated reference value of the cell voltage reduction time and the calculated reference value of the cell voltage deviation, respectively.

2. The method of claim 1, wherein the step of measuring measures voltages of some or all of a plurality of cells included in the fuel cell stack when the air supply is blocked.

3. The method of claim 1, wherein the step of estimating estimates that the amount of residual water in the fuel cell stack increases as the current time value reduces.

4. The method of claim 1, wherein the step of estimating estimates that the amount of residual water in the fuel cell stack increases as the current deviation value increases.

5. The method of claim 1, wherein the step of removing controls the air compressor according to a predetermined revolutions per minute (RPM) command during a predetermined duration based on the estimated amount of water.

6. The method of claim 1, further comprising, before the blocking the air supply:
   measuring, by a temperature sensor, an external air temperature of the fuel cell stack; and
   determining, by a freezing determining processor, freezing of the residual water in the fuel cell stack based on the measured external air temperature.

7. The method of claim 1, wherein the step of calculating calculates the reference value of the cell voltage reduction time and the reference value of the cell voltage deviation in the FC stop mode after starting of the fuel cell, respectively.

8. The method of claim 1, further comprising, after the removing the residual water in the fuel cell stack, steps of:
   re-estimating the amount of residual water in the fuel cell stack while the air supply to the fuel cell stack is blocked; and
   removing the residual water in the fuel cell stack based on the re-estimated amount of residual water in the fuel cell stack.

9. The method of claim 1, further comprising, after the removing the residual water in the fuel cell stack, steps of:
   re-estimating the amount of residual water in the fuel cell stack while the air supply to the fuel cell stack is blocked; and
   completing the shutting down.

10. The method of claim 8, further comprising, after the removing the residual water in the fuel cell stack, steps of:
   calculating a re-estimation value of the cell voltage reduction time and a re-estimation value of the cell voltage deviation, respectively, while the air supply to the fuel cell stack is blocked; and
   removing the residual water in the fuel cell stack according to whether or not the re-estimation value of the cell voltage reduction time and the re-estimation value of the cell voltage deviation are included in a threshold of the cell voltage reduction time having the reference value of the cell voltage reduction time and a threshold of the cell voltage deviation having the reference value of the cell voltage deviation, respectively, or completing the shutting down.

11. The method of claim 8, further comprising, after the removing the residual water in the fuel cell stack, steps of:
   calculating a re-estimation value of the cell voltage reduction time and a re-estimation value of the cell voltage deviation, respectively, while the air supply to the fuel cell stack is blocked; and
   completing the shutting down.

12. The method of claim 10, wherein the step of removing the residual water in the fuel cell stack or completing the shutting down removes the residual water in the fuel cell stack by driving the air compressor based on the re-estimation value of the cell voltage reduction time and the re-estimation value of the cell voltage deviation when the re-estimation value of the cell voltage reduction time is not included in the normal range of the cell voltage reduction time or the re-estimation value of the cell voltage deviation is not included in the normal range of the cell voltage deviation.

13. A system for removing residual water in a fuel cell stack, comprising:
   the fuel cell stack;
   an air compressor for supplying air to the fuel cell stack;
   a cell voltage sensor for measuring a plurality of cell voltages included in the fuel cell stack;
   a water amount estimating processor for estimating an amount of residual water in the fuel cell stack based on the plurality of cell voltages measured by the cell voltage sensor upon shutting down of fuel cell;
   a driving controller for removing the residual water in the fuel cell stack by driving the air compressor based on the amount of water estimated by the water amount estimating processor; and
   a reference value setting processor for setting a reference value of a cell voltage reduction time or a reference value of a cell voltage deviation based on the measured cell voltages in a fuel cell (FC) stop mode of fuel cell,
   wherein the cell voltage reduction time is a period of time from when the air supply is blocked to when a minimum value of the measured cell voltages of the fuel cell stack becomes equal to or smaller than a predetermined cell voltage,
   wherein the cell voltage deviation is a difference between a maximum value and the minimum value of the measured cell voltages of the fuel cell stack when a predetermined period of time, from when the air supply is blocked, elapses
   wherein the water amount estimating processor estimates the amount of residual water in the fuel cell stack based on a current time value of the cell voltage reduction time or a current deviation value of the cell voltage deviation.

14. The system of claim 13, further comprising a freezing determining processor for determining freezing of the residual water in the fuel cell stack based on an external air temperature measured by using a temperature sensor.

* * * * *